United States Patent
Trepte et al.

(10) Patent No.: US 6,331,334 B1
(45) Date of Patent: Dec. 18, 2001

(54) CONTAINER LINER

(75) Inventors: Peter Trepte, Emsdetten; Guenter Luettgens, Odenthal, both of (DE)

(73) Assignee: Empac Verpackungs GmbH, Emsdetten (DE)

( * ) Notice: Subject to any disclaimer, the term of this patent is extended or adjusted under 35 U.S.C. 154(b) by 0 days.

(21) Appl. No.: 09/171,869

(22) PCT Filed: Apr. 28, 1997

(86) PCT No.: PCT/EP97/02189

§ 371 Date: Oct. 27, 1998

§ 102(e) Date: Oct. 27, 1998

(87) PCT Pub. No.: WO97/42103

PCT Pub. Date: Nov. 13, 1997

(30) Foreign Application Priority Data

May 3, 1996 (DE) ................................................ 196 17 902

(51) Int. Cl.[7] ............................ B65D 35/14; B65D 81/00
(52) U.S. Cl. ...................... 428/35.7; 428/35.8; 428/131; 428/132; 428/136; 428/172; 220/495.06; 220/674; 220/676; 206/484; 206/524.3
(58) Field of Search ................... 428/35.7, 35.8, 428/131, 132, 35.3, 138, 201, 134, 136, 36.5, 36.9, 172, 183, 182, 179, 159; 493/93; 220/495.01, 495.06, 669, 676, 674, 670, 908.1; 206/446, 484, 484.1, 484.2, 524.3

(56) References Cited

U.S. PATENT DOCUMENTS

| | | | | |
|---|---|---|---|---|
| 4,464,081 | * | 8/1984 | Hillier et al. | 405/128 |
| 4,871,613 | * | 10/1989 | Akao | 428/328 |
| 5,458,951 | * | 10/1995 | Kagawa | 428/155 |
| 5,514,299 | * | 5/1996 | Kalwara | 252/511 |
| 5,626,944 | * | 5/1997 | Rasmussen | 428/172 |
| 5,759,649 | * | 6/1998 | Dinter et al. | 428/35.3 |

FOREIGN PATENT DOCUMENTS

| | | |
|---|---|---|
| 4309832 | 1/1994 | (DE) . |
| 0699599 | 3/1996 | (EP) . |

\* cited by examiner

*Primary Examiner*—Paul Thibodeau
*Assistant Examiner*—Monique R. Jackson
(74) *Attorney, Agent, or Firm*—Jordan and Hamburg LLP

(57) ABSTRACT

A flexible container liner, preferably for use in containers capable of dissipating electrostatic charges, with at least one liner wall which includes a single layer or multilayer wall material, preferably of polymers, such as LDPE monofilm, a co-extruded polymer film or the like, the liner wall having a layer which is electrically non-conductive, in order to meet high requirements with respect to the non-chargeability of the container and with regard to very good barrier properties against the passage of gases, is so constructed that either at least one layer of the liner wall has microrecesses extending at least over a portion of its thickness or microprotrusions, which have material of reduced thickness in their front region lying parallel to the layer, are disposed in at least one layer of the liner wall.

29 Claims, 4 Drawing Sheets

CONTAINER LINER

BACKGROUND OF THE INVENTION

The invention relates to a container liner, preferably for use in flexible bulk goods containers.

Flexible bulk goods containers are used for the packaging, transporting, wrapping and stockpiling of different bulk goods materials, in each case in amounts of 500 to 2000 kg, and are also used in areas, in which there is a danger of explosion. This danger of explosion can arise, for example, when filling a bulk goods container (FIBC) with materials capable of producing dust explosions. When such an FIBC is emptied, there is moreover not only the danger of a dust explosion, but also the danger of a vapor or gas explosion, if the FBIC is emptied into a container, in which there already is a flammable liquid. To avoid the danger of ignition resulting from electrostatic charges, bulk goods containers must be used, which are electrostatically conductive on the inside and the outside and grounded, in all areas, in which there is a danger of explosion due to flammable gases, vapors or dust.

Therefore, when designing electrostatically conductive bulk goods containers, the risks of a brush discharge, in the case of gases and vapors with a low minimum ignition energy, as well as the risks of sliding-style brush discharge, which is attributed particularly to charged double layers, must be taken into consideration. Likewise, however, it is also necessary to make certain that the bulk goods container has strength properties, which permit stockpiling of bulk goods up to 2 tons, and is sufficiently tight, so that dust does not emerge through the woven fabric.

Usually, flexible bulk goods containers are produced from flexible polypropylene tape. By weaving in electrically conductive tapes in the warp and filling directions, the basic fabric of the container is divided into electrostatically separate area elements not larger than $10^4$ mm$^2$, so that brush discharges, capable of causing an ignition, cannot start out from the charged surfaces of the insulating material.

Since the flexible bulk goods containers of woven tapes inherently do not prevent the passage of dust, they are provided on the inside of the container with a coating preferably of polypropylene.

For certain high-grade chemical products and sensitive foods, it is moreover necessary to make a barrier layer available, which has a low permeability for water vapor, nitrogen, oxygen, carbon dioxide or aromas contained in the food. Such a barrier layer may be realized in the form of a container liner, which is inserted in the flexible transport containers as an internal container. As a result, the liner itself may have comparatively lower strength properties. However, in its interaction with the external transport container, it must fulfill the requirements for preventing electrostatic charges.

For this purpose, there are protection classes, which the containers must fulfill and which can be looked up, for example, at the professional association of the chemical industry. Containers, which are assigned to the protection class B (only danger of a dust explosion), may contain a chargeable container material; however, sliding-style brush discharges must not arise. These are avoided reliably if the electric breakdown voltage, measured over the whole of the wall structure (container with or without an inner sack) does not exceed 4 kV.

Containers of protection class C (additional explosion danger due to gases and vapors) must be capable of dissipating electrostatic charges, that is, the leakage resistance must be less than $10^8\Omega$ at each place of the inside and outside of the container (including the lamination and/or the inner sack) and the container must be grounded.

In order to fulfill these requirements with respect to the leakproofness of such a container on the one hand and with respect to the ability of the wall material to dissipate electrostatic charges on the other, it was proposed (DE 43 09 832 A1) that an electrically insulating layer on a conductive support be perforated. By these means, the insulation of the conductive support is perforated pointwise and the danger of discharges capable of igniting is prevented (protection class C). This perforation is produced by electric breakdown of the insulation.

Such coated wall material, the charge on which can be dissipated electrostatically, does not have adequate barrier properties for certain chemical products and foods. Moreover, it is necessary to produce the walls of such containers with the help of sewing machines. Needle-insertion holes decrease leakproofness considerably and permit penetration by water during outside storage. It is a further problem that adequate cleanliness for pharmaceutical products cannot be attained by the manufacturing step.

In order to attain adequate barrier properties, outside storage capabilities and/or adequate cleanliness for containers capable of dissipating electrostatic charges, liners are also already being used at the present time. However, they do not fulfill or do not fulfill reliably the requirements of the above-mentioned classes B and C, such as liners with antistatic active ingredient concentrates (such as ethoxylated alkylamine). The antistatic effect is achieved owing to the fact that the active ingredients migrate to the surface of the liners and bind moisture. A surface resistance of $10^9\Omega$ to $10^{11}\Omega$ is achieved. The effect depends on the relative humidity of the air in the surroundings of the liner. Physiological safety is not an established fact. The effect is time-limited (not more than 18 months).

Polymeric monofilms, into which conductive carbon black compounds are incorporated, are also used on the market as liners. Carbon black compounds are very expensive. Moreover, they have the disadvantage that they are classified as carcinogenic and that the sealed seam strength of these films is very slight. Because of these disadvantages, the films are also offered in co-extruded form, usually with a layer about 75 $\mu$m thick, with conductive carbon black compounds and a layer 25 $\mu$m thick without conductive carbon black compounds. The 25 $\mu$m thick layer is to protect the contents of the container against the negative properties of the conductive carbon black compounds. On the other hand, the 25 $\mu$m layer is intended to ensure that the breakdown voltage of 4 kV is not exceeded. On the basis of the state of the art, it is not possible to reduce the 25 $\mu$m layer thickness further, in order to attain a breakdown voltage, which is clearly less than 4 kV. It must also be expected that the thickness of the layer is not uniform and that therefore the desired breakdown voltage is exceeded in parts. Moreover, such a wall material cannot fulfill the barrier properties addressed above, which are required for certain chemical products and foods.

SUMMARY OF THE INVENTION

It is a therefore an object of the present invention to develop a container liner for flexible containers for bulk goods in such a manner that, on the one hand, the requirements that the FIBC cannot develop a static charge are fulfilled and, on the other, the container liner has very good barrier properties with respect to sealing against the passage of gases.

The microrecesses, which do not perforate the layer completely, achieve, on the one hand, that the imperviousness of the layer, provided with the microrecesses, is maintained and, on the other, that the breakdown voltage is kept very low, so that a dangerously high charging of the layer material is avoided reliably. Advantageously, the microrecesses extend over a region of 15% to 95% of a thickness of a liner wall including the layer provided with the microrecesses.

Even with the microprotrusions provided in accordance with an embodiment of the invention, the imperviousnes of the layer, provided with the protrusions, is maintained; on the other hand, by reducing the thickness of the material in the region of the microrecesses, the electrical breakdown voltage is reduced reliably to values smaller than 4 kV.

Depending on the construction of the inventive container liner, the requirements of the different protection classes can be fulfilled. The requirements of protection class B can be fulfilled by a single LDPE film, which is used as liner for a flexible container for bulk goods.

The requirements of protection class C can be fulfilled if, as described in further claims, the container liner is constructed in several layers and comprises at least one electrically conductive layer.

Further advantages arise out of the drawing and the following description of several examples.

IN THE DRAWINGS

DESCRIPTION OF THE PREFERRED EMBODIMENTS

A container liner has at least one insulating layer 2; 2'; 2"; Further layers may also be used for example in the form of the conductive layers 3, to which may also be coated on both sides. In each case, microrecesses 7; 7' or microprotrusions 7" are disposed in one layer and extend over a partial region of the thickness of the latter. Even in the case of layers 2, 3' provided with microrecesses 7; 7', it is possible for other layers 2' to have a complete microperforation 8', that is, openings passing through the whole thickness of the layer.

Figure 1:
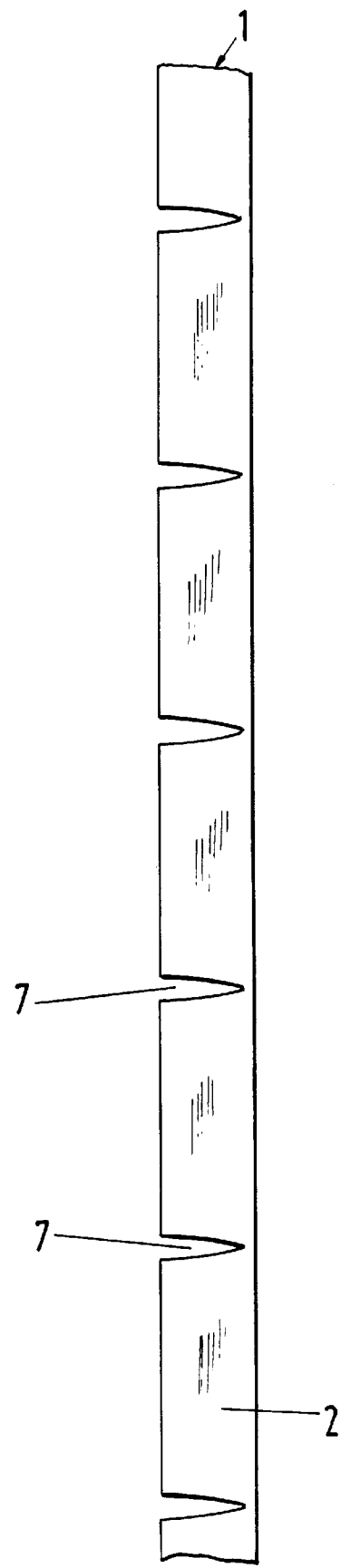
FIG. 1 shows a diagrammatic cross section through a single layer liner wall.
Figure 2:
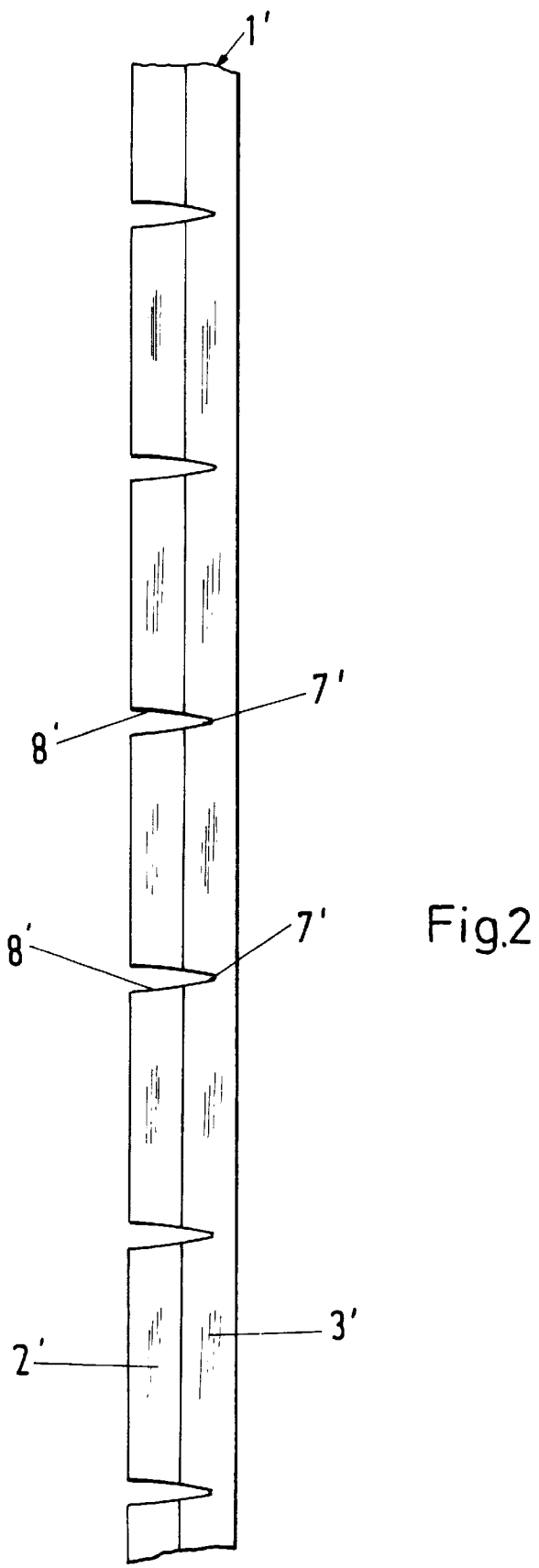
FIG. 2 shows a similar view of a two-layer liner wall.
Figure 3:
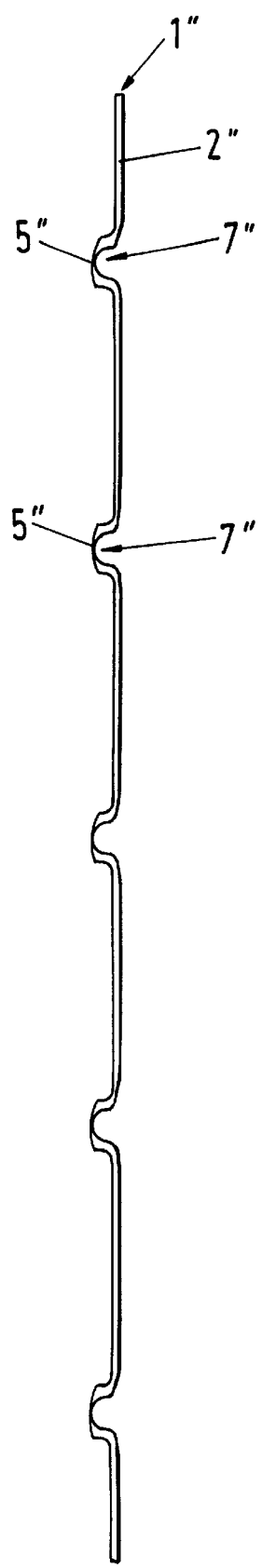
FIG. 3 shows a view similar to that of FIG. 1 of a single layer liner wall provided with microprotrusions.
Figure 4:
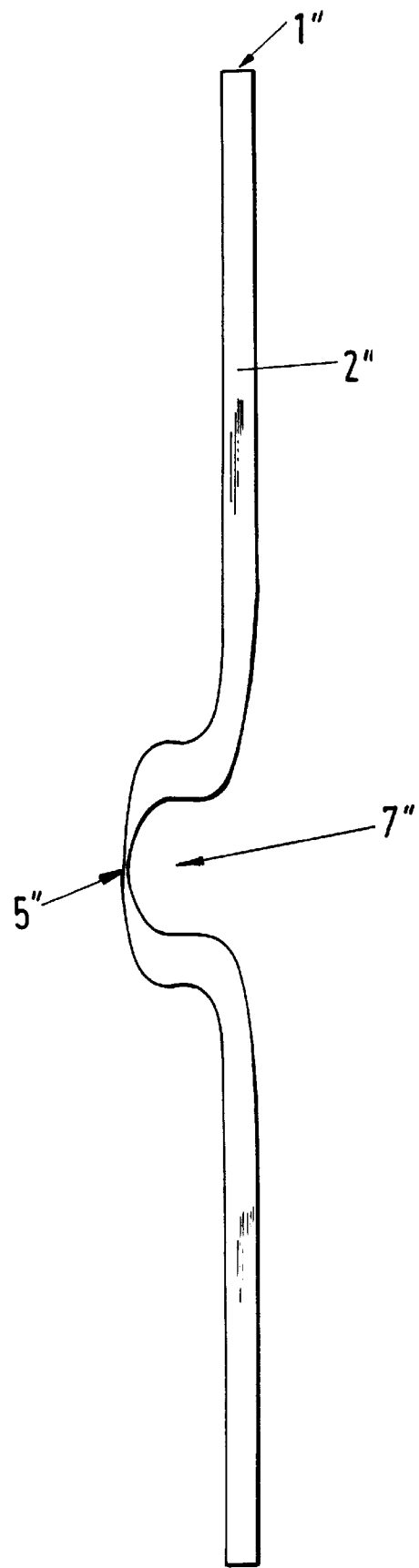
FIG. 4 shows a detailed enlargement of FIG. 3.

Arrangements of layers, other than those shown in FIGS. 1 to 4, are possible. The thickness of the liner wall 1; 1'; 1" is between about 60 and 300 $\mu$m in order to achieve a still adequate mechanical strength.

The embossing of the microrecesses 7; 7' and also of the microperforation 8' is brought about by an arrangement of rotatable rollers, which have spikes, with which they engage the wall 1; 1' of the liner, distributed over their periphery and thus bring about the microrecesses 7; 7' and the microperforation 8'. For this purpose, a dolly is required, so that the pressure, with which the spikes press into the wall 1; 1' of the liner, can be varied. The spikes are disposed radially variably, so that the length of their free region, protruding from the roller, can be adjusted and, with that, the depth of penetration into the material of the layer can be adjusted to meet the requirements.

The electrically insulating layers 2; 2'; 2" are capable of gelling, that is, they can be welded or glued, perhaps for joining a filler connecting piece to the liner.

In the following, three examples of a liner wall 1; 1'; 1" are described.

EXAMPLE 1

The liner wall 1 comprises only one layer, which preferably consists of low density polyethylene (LDPE) and is about 100 $\mu$m thick. In the region of the microrecesses 7, the thickness of the layer, depending on the material, is only about 5 to 20 $\mu$m, in order to ensure that the breakdown voltage does not exceed 4 kV.

Since the microrecesses 7 do not intersperse the film 2 completely, the imperviousness of this liner wall 1 is ensured, and it can be glued or welded, in order thus to present a completely tight inner lining of a flexible container for bulk goods. This is necessary particularly in the area of the sewn edges of the bulk goods container, which are usually manufactured from a woven material, since the needle punctures here result in pores, through which dust can escape from the bulk goods container and which also prevent gas tightness. Such a liner provides a remedy here.

By means of the microrecesses 7, it is ensured that the breakdown voltage of the wall material as a whole, the inner layer of which is formed by the liner present here, is less than 4 kV, so that the wall of the bulk of goods container fulfills the requirements of the protection class B. Nevertheless, charge phenomena between the microrecesses 7 in the polyethylene film cannot be avoided completely. The requirements of protection class C cannot be fulfilled in this manner. The liner wall 1', shown in Example 2, provides a remedy here.

EXAMPLE 2

The liner wall 1 is constructed in two layers and comprises an electrically insulating layer 2' and an electrically conducting layer 3'. The total thickness of the liner wall 1' is about 100 $\mu$m, of which about 30 percent is taken up by the electrically insulating layer 2'.

The electrically conducting layer 3' ensures that charges on the liner wall 1' are avoided and a dissipation resistance of less than $10^8 \Omega$ is reached with respect to ground, so that the requirements of protection class C are fulfilled.

The electrically insulating layer 2' is interspersed completely by microperforations 8', so that the actual sealing function is taken over by the electrically conductive layer 3'. The latter has microrecesses 7', so that the breakdown voltage is reduced here also in comparison to a layer of the flexible bulk goods container that is further towards the outside. The electrically conductive layer 3' consists preferably of a polymer matrix, into which electrically conducting additives, particularly carbon black particles, are admitted.

Such a liner wall 1' is produced preferably by the co-extrusion of the two film portions.

It is, however, also possible to use a metallic foil, such as an aluminum foil, as conductive layer 3'. This metallic foil can be coated on both sides with electrically insulating layers, so that, overall, at least a three-layer or a multilayer composite results. Here also, some outer layers once again can have a microperforation 8' and thus be interspersed completely; on the other hand, inner layers are provided only with microrecesses 7, 7', in order to maintain the imperviousness of the liner wall 1, 1'. The layers of the composite can be joined together by known manufacturing processes.

EXAMPLE 3

As in Example 1, the liner wall 1" here comprises also only one layer, which preferably consists of low density polyethylene (LDPE) and is about 100 μm thick. However, in contrast to the previous Examples, the liner wall 1" has no microrecesses 7 and 7' here, which extend over a partial region of the layer thickness. Instead, it has microprotrusions 7", in the regions of which the layer is embossed out of the surface and, with that, the overall thickness is increased.

Nevertheless, a reduction in the thickness of the material in regions 5" of the microprotrusions 7" oriented parallel to the layer is achieved here also in the region of the microprotrusions 7". By these reductions in the thickness of the material, the breakdown voltage of a liner wall 1", so produced, is decreased to such an extent, that the requirements of protection class B can be fulfilled. Nevertheless, there may also be charging phenomena here between the microprotrusions 7", so that the requirements of protection class C cannot be fulfilled by a film consisting only of polyethylene. Aside from the construction of a single layer liner wall 1", as previously described hereinbefore and as in Example 1, it is also possible to produce a composite layer with at least one conductive layer, as previously described hereinbefore and as in Example 2, even in the case of such a liner wall 1" with microprotrusions 7".

It is self-evident that the three examples named here are only a portion of the spectrum of possibilities, which are opened up by the invention. In each case, microrecesses 7; 7' or microprotrusions 7" are disposed at a suitable, small distance from one another, so that, on the one hand, the breakdown voltage is sufficiently small and dangerous charges cannot accumulate between the microrecesses 7; 7' and microprotrusions 7" and, on the other, imperviousness of the liner wall 1; 1'; 1" with respect to dust and gases is ensured in every case, so that flexible bulk goods containers, provided with a container liner so equipped, are suitable for transporting herbicides and fungicides or also coffee and spices, gluing or welding of the liner wall 1; 1'; 1" especially at the edge regions or in regions, where filler necks are integrally molded, is possible and no openings, which pass completely through the liner wall 1; 1'; 1", are formed by sewing or by a continuous perforation.

What is claimed is:

1. A flexible container, comprising:
   a bulk goods container including conductive structures for dissipating electrostatic charges; and
   at least one liner wall comprised of at least one layer, said at least one layer including at least one non-conductive layer, at least one of said at least one layer having microrecesses extending partially through a thickness thereof.

2. A flexible container according to claim 1, wherein said at least one non-conductive layer comprises a polymer.

3. A flexible container according to claim 1, wherein said at least one liner wall is comprised of LDPE monofilm.

4. A flexible container according to claim 1, wherein said at least one liner wall is comprised of a coextruded polymer film.

5. A flexible container according to claim 1, wherein the microrecesses extend over a region of 15% to 95% of the thickness of said at least one liner wall.

6. A flexible container according to claim 1, wherein said at least one layer is provided as a singe layer of electrically non-conductive material, said liner wall consisting essentially of said single layer.

7. A flexible container according to claim 6, wherein the thickness of the liner wall adjacent to the microrecesses is between 60 and 300 μm.

8. A flexible container according to claim 6, wherein the liner wall includes low density polyethylene film.

9. A flexible container according to claim 1, wherein said at least one layer of the liner wall further includes at least one electrically conductive layer.

10. A flexible container according to claim 9, wherein the electrically conductive layer is comprised of a polymer film that has been provided with additives.

11. A flexible container according to claim 9, wherein the electrically conductive layer is comprised of a metallic foil.

12. A flexible container according to claim 11, wherein the metallic foil forming the electrically conductive layer is coated on both sides.

13. A flexible container according to claim 9, wherein the liner wall is comprised of layers produced by a co-extrusion process.

14. A flexible container according to claim 9, wherein the liner wall is comprised of layers which are glued together.

15. A flexible container according to claim 1, wherein an electric breakdown voltage measured over a whole of the liner wall does not exceed 4 kV.

16. A flexible container, comprising:
    a bulk goods container including conductive structures for dissipating electrostatic charges; and
    at least one liner wall including at least one layer, said at least one layer including at least one electrically non-conductive layer, at least one of said at least one layer having microprotrusions which have at least portions of reduced thickness in front regions thereof lying parallel to a remainder of the at least one of said at least one layer.

17. A flexible container according to claim 16, wherein said at least one electrically non-conductive layer comprises a polymer.

18. A flexible container according to claim 17, wherein said at least one electrically non-conductive layer is LDPE monofilm.

19. A flexible container according to claim 16, wherein said at least one liner wall is comprised of a coextruded polymer film.

20. A flexible container liner, comprising at least one liner wall which includes at least one layer, said at least one layer including at least one non-conductive layer, at least one of said at least one layer having microrecesses extending over only a portion of the thickness thereof, an electric breakdown voltage measured over a whole of the liner wall not exceeding 4 kV.

21. A flexible container liner, comprising at least one liner wall which includes at least one layer, said at least one layer including at least one electrically non-conductive layer, at least one of said at least one layer having microprotrusions which have at least portions of reduced thickness in front regions thereof lying parallel to a remainder of the at least one of said at least one layer, an electric breakdown voltage measured over a whole of the liner wall not exceeding 4 kV.

22. A method of inhibiting development of a static charge in a flexible container for bulk goods while concomitantly providing a barrier against outward passage of stored product, the flexible container including conductive structures for dissipating electrostatic charges transferred thereto from the stored product, the method comprising:

lining an interior of said bulk goods container with at least one liner wall, said at least one liner wall including at least one layer, said at least one layer including at least one non-conductive layer, at least one of said at least one layer having spaced apart regions of reduced thickness as compared to a thickness of said at least one of said at least one layer between said spaced apart regions.

23. A method according to claim 22, wherein at least a portion of said regions are defined by microrecesses extending only partially through a thickness of said at least one of said at least one layer.

24. A method according to claim 22, wherein at least a portion of said regions are defined by microprotrusions which have at least portions of reduced thickness in front regions thereof lying parallel to a remainder of the at least one of said at least one layer.

25. A method according to claim 22, wherein an electric breakdown voltage measured over a whole of the liner wall does not exceed 4 kV.

26. A method according to claim 22, wherein the regions of reduced thickness are reduced by 15% to 95% of the thickness of said at least one liner wall between said spaced apart regions.

27. A method according to claim 22, wherein said at least one layer of said at least one liner wall further includes at least one electrically conductive layer.

28. A method according to claim 22, wherein the regions of reduced thickness have a thickness of between 5 and 20 $\mu$m.

29. A method according to claim 22, wherein the thickness of said at least one liner wall between said spaced apart regions is between 60 and 300 $\mu$m.

* * * * *